(12) United States Patent
Rajendran

(10) Patent No.: US 8,455,573 B2
(45) Date of Patent: Jun. 4, 2013

(54) CURABLE COMPOSITION COMPRISING IMIDAZOLIUM MONOCARBOXYLATE SALT

(75) Inventor: Govindasamy Paramasivam Rajendran, Garnet Valley, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 246 days.

(21) Appl. No.: 12/972,630

(22) Filed: Dec. 20, 2010

(65) Prior Publication Data

US 2012/0157572 A1 Jun. 21, 2012

(51) Int. Cl.
*C08G 59/68* (2006.01)
*C08G 59/62* (2006.01)
*C08L 63/00* (2006.01)
*B32B 27/26* (2006.01)
*B32B 27/38* (2006.01)

(52) U.S. Cl.
USPC .......................................... 523/455; 523/461

(58) Field of Classification Search
USPC .............. 428/297.4, 413, 414, 415, 416, 417, 428/418; 523/455, 461
See application file for complete search history.

(56) References Cited

U.S. PATENT DOCUMENTS

| | | | |
|---|---|---|---|
| 3,746,686 A | | 7/1973 | Marshall et al. |
| 4,331,582 A | | 5/1982 | Babayan |
| 4,713,137 A | * | 12/1987 | Sexton ........................ 156/233 |
| 5,242,748 A | * | 9/1993 | Folda et al. ................... 442/175 |
| 5,972,735 A | | 10/1999 | Dominic |
| 6,709,741 B1 | | 3/2004 | Lin et al. |
| 2001/0018122 A1 | | 8/2001 | Yuyama et al. |
| 2002/0012780 A1 | | 1/2002 | Yuyama et al. |
| 2005/0218195 A1 | | 10/2005 | Wilson et al. |
| 2006/0234043 A1 | | 10/2006 | Nakanishi et al. |
| 2009/0030158 A1 | | 1/2009 | Amano et al. |
| 2009/0159313 A1 | * | 6/2009 | Valette et al. ................. 174/250 |
| 2010/0016475 A1 | * | 1/2010 | Doering et al. ............... 523/461 |
| 2010/0092764 A1 | * | 4/2010 | Chung et al. ................. 428/331 |
| 2010/0179250 A1 | | 7/2010 | Ono et al. |
| 2010/0279469 A1 | | 11/2010 | Jin |
| 2012/0004349 A1 | * | 1/2012 | Kaneko et al. ................ 523/454 |

FOREIGN PATENT DOCUMENTS

| | | |
|---|---|---|
| JP | 11-343476 A1 | 12/1999 |
| JP | 1999/343476 A2 | 12/1999 |
| JP | 2002-020714 A1 | 1/2002 |
| WO | WO 2006128542 A1 * | 12/2006 |
| WO | WO 2009037862 A1 * | 3/2009 |
| WO | WO 2010103809 A1 * | 9/2010 |

OTHER PUBLICATIONS

International Search Report, Intl Application No. PCT/US2011/066253, Intl Filing Date Dec. 20, 2011.
Rajendran et al, U.S. Appl. No. 12/972,622, filed Dec. 20, 2010.
Rajendran et al, U.S. Appl. No. 12/972,642, filed Dec. 20, 2010.
Rajendran et al, U.S. Appl. No. 12/972,648, filed Dec. 20, 2010.

* cited by examiner

*Primary Examiner* — Michael J Feely

(57) ABSTRACT

Disclosed are curable epoxy compositions comprising imidazolium monocarboxylate salts as curing catalysts and method for curing same. The imidazolium monocarboxylate salt is suitable for use as latent catalysts that effect curing upon heating to a curing temperature threshold. The curable compositions prepared therefrom are used to prepare coated substrates, and to produce conformally sealed printed wiring boards. Of particular utility are curable compositions comprising 2-ethyl-4-methyl imidazolium monocarboxylate salts.

12 Claims, No Drawings

CURABLE COMPOSITION COMPRISING IMIDAZOLIUM MONOCARBOXYLATE SALT

CROSS REFERENCE TO RELATED APPLICATIONS

This patent application is related to copending U.S. patent application Ser. No. 12/972,622, entitled "Imidazolium monocarboxylate salt and method for preparation thereof," Ser. No. 12/972,642, entitled "Article having curable coating comprising imidazolium monocarboxylate salt," and Ser. No. 12/972,648, entitled "Method for preparing multilayer article by curing a curable composition comprising imidazolium monocarboxylate salt."

FIELD OF THE INVENTION

This invention is related to the preparation of imidazolium carboxylate salt compositions suitable for use as latent catalysts in epoxy compositions, curable compositions prepared therefrom, coated articles comprising the curable compositions, methods of curing, and multilayer conformally sealed printed wiring boards.

BACKGROUND OF THE INVENTION

It is well-known to employ 2,4-dialkyl imidazole as a curing catalyst in phenol-curable epoxy compositions. However, the presence of a curing catalyst in a curable composition in storage tends to induce some degree of curing thereby reducing storage time. Furthermore, in use, heating to the curing temperature results in significant variation in cure rate from place to place thereby leading to inhomogeneities in the cured object.

It is known in the art to employ latent catalysts in order to bring the above stated problems under control. A latent catalyst is one that does not catalyze curing of the epoxy composition until some threshold condition, typically a threshold temperature, is reached. However, the requirements for a latent catalyst to be of practical use are stringent. A latent catalyst should not be activated until the desired curing temperature is reached, typically in the range of 130 to 180° C. In addition, the catalyst, to be useful in high value applications in electronics, needs to be effective in curing reactions that do not produce gaseous by-products which can create bubbles in the cured layer. The catalyst needs to be soluble in the solvents, such as methyl-ethyl ketone (MEK) that are employed in common epoxy compositions.

Shigemitsu et al., JP1999343476(A), discloses a curable composition comprising a 2,4 alkyl-substituted imidazole, benzoic acid, an epoxy, and amine curing agent. The benzoic acid is employed in considerable excess over the imidazole to reduce the water sensitivity of the amine curing agent.

Amano et al., US 2009/0030158, discloses a curing catalyst for epoxy compositions comprising a 1,3-alkyl-substituted monocarboxylic acid.

SUMMARY OF THE INVENTION

In one aspect the invention provides a composition comprising an imidazolium monocarboxylate salt represented by Structure I,

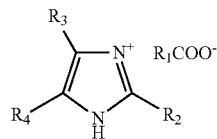

wherein $R_1$ is aliphatic, including aryl aliphatic, or aromatic; $R_2$, $R_3$, and $R_4$ are independently hydrogen or alkyl, with the proviso that at least one of $R_2$, $R_3$, or $R_4$ must be alkyl.

In one embodiment, the imidazolium monocarboxylate salt is 2-ethyl-4-methyl imidazolium benzoate.

In another aspect, the invention provides a process comprising combining in a mutual solvent having a boiling point below 100° C., an imidazole and a monocarboxylic acid to form a reaction mixture, heating said reaction mixture to reflux temperature, and holding thereat at least until the desired degree of conversion has been reached; wherein the monocarboxylic acid is an aliphatic monocarboxylic acid, including aryl aliphatic monocarboxylic acid, or aromatic monocarboxylic acid; and wherein the imidazole is represented by Structure II,

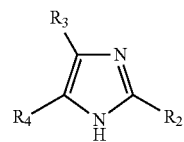

wherein $R_2$, $R_3$, and $R_4$ are independently hydrogen or alkyl, with the proviso that at least one of $R_2$, $R_3$, or $R_4$ must be alkyl.

In one embodiment the imidazole is 2-ethyl-4-methyl imidazole and the monocarboxylic acid is benzoic acid.

In another aspect, the invention provides a curable composition comprising a solution comprising an epoxy, a phenolic curing agent, and an imidazolium monocarboxylate salt, dissolved in a solvent, the imidazolium monocarboxylate salt represented by Structure I.

In one embodiment, the imidazolium monocarboxylate salt is the benzoate salt of 2-ethyl-4-methyl imidazole.

In another aspect, the invention provides a method for preparing a cured epoxy composition, the method comprising combining an epoxy, a phenolic curing agent, and an imidazolium monocarboxylate salt to form a reaction mixture, and heating said reaction mixture to a temperature in the range of 120 to 200° C., and maintaining the temperature until the desired level of curing has taken place, wherein the imidazolium monocarboxylate salt is represented by Structure I.

In another aspect, the invention provides a method for preparing a coated substrate, the method comprising causing an uncured epoxy solution to be coated onto a substrate at a temperature below 100 C, wherein said uncured epoxy solution comprises a combination of an epoxy, a phenolic curing agent, an imidazolium monocarboxylate salt, dissolved in a solvent, wherein the imidazolium monocarboxylate salt is represented by Structure I.

In another aspect, the invention provides a coated substrate comprising a substrate having disposed thereupon a coating where said coating comprises an uncured epoxy composition comprising a combination of an epoxy, a phenolic curing agent, and an imidazolium monocarboxylate salt, wherein the imidazolium monocarboxylate salt is represented by Structure I.

In another aspect, the invention provides a method for preparing a multilayer article comprising contacting a first substrate having a coating to a second substrate such that said coating is disposed between said first and second substrate, forming an uncured multilayer article, applying heat and pressure to said multilayer article thereby forming a cured multilayer article, said coating comprising an uncured epoxy composition comprising a combination of an epoxy, a phenolic curing agent, and an imidazolium monocarboxylate salt represented by Structure I.

DETAILED DESCRIPTION OF THE INVENTION

For the purposes of the present invention when a range of values is provided herein, it is intended to encompass the end-points of the range unless specifically stated otherwise. Numerical values used herein have the precision of the number of significant figures provided, following the standard protocol in chemistry for significant figures as outlined in ASTM E29-08 Section 6. For example, the number 40 encompasses a range from 35.0 to 44.9, whereas the number 40.0 encompasses a range from 39.50 to 40.49.

In one aspect the invention provides a composition comprising an imidazolium monocarboxylate salt represented by Structure I,

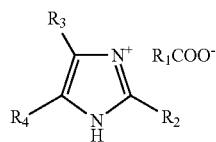

I wherein $R_1$ is aliphatic, including aryl aliphatic, or aromatic; $R_2$, $R_3$, and $R_4$ are independently hydrogen or alkyl, with the proviso that at least one of $R_2$, $R_3$, or $R_4$ must be alkyl.

In one embodiment, $R_1$ is phenyl, 4-methyl phenyl, 4-ethyl phenyl, naphthyl, or hexyl. In a further embodiment, $R_1$ is phenyl.

In one embodiment, $R_2$ and $R_3$ are alkyl, and $R_4$ is hydrogen. In a further embodiment, $R_2$ is ethyl, $R_3$ is methyl, and $R_4$ is hydrogen.

In one embodiment, the imidazolium monocarboxylate salt is 2-ethyl-4-methyl imidazolium benzoate.

In another aspect, the invention provides a process comprising combining in a mutual solvent having a boiling point below 100° C., an imidazole and a monocarboxylic acid to form a reaction mixture, heating said reaction mixture to reflux temperature, and holding thereat at least until the desired degree of conversion has been reached; wherein the monocarboxylic acid is an aliphatic monocarboxylic acid, including aryl aliphatic monocarboxylic acid, or aromatic monocarboxylic acid; and wherein the imidazole is represented by Structure II,

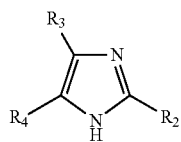

II wherein $R_2$, $R_3$, and $R_4$ are independently hydrogen or alkyl, with the proviso that at least one of $R_2$, $R_3$, or $R_4$ must be alkyl.

Suitable solvents include both polar and nonpolar solvents, including but not limited to benzene, methyl ethyl ketone (MEK), tetrahydrofuran (THF), dioxane, ethyl acetate, so long as the reflux temperature of said solution does not exceed 100° C. In one embodiment, the solvent is MEK.

In one embodiment, $R_1$ is phenyl, 4-methyl phenyl, 4-ethyl phenyl, naphthyl, or hexyl. In a further embodiment, $R_1$ is phenyl.

In one embodiment, $R_2$ and $R_3$ are alkyl, and $R_4$ is hydrogen. In a further embodiment, $R_2$ is ethyl, $R_3$ is methyl, and $R_4$ is hydrogen.

In one embodiment the imidazole is 2-ethyl-4-methyl imidazole and the monocarboxylic acid is benzoic acid.

In another aspect, the invention provides a curable composition comprising a solution comprising an epoxy, a phenolic curing agent, and an imidazolium monocarboxylate salt, dissolved in a solvent, wherein the imidazolium monocarboxylate salt is represented by Structure I.

Suitable uncured epoxies include but are not limited to novolac phenol, cresol novolac, epoxies based on bisphenol A, epoxies based on biphenol, or epoxy adducts of carboxy terminated rubbers.

Suitable solvents include both polar and nonpolar solvents, including but not limited to benzene, methyl ethyl ketone (MEK), tetrahydrofuran (THF), dioxane, ethyl acetate. In one embodiment of the curable composition hereof, the solvent is MEK.

In one embodiment of the curable composition hereof, $R_1$ is phenyl, 4-methyl phenyl, 4-ethyl phenyl, naphthyl, or hexyl. In a further embodiment of the curable composition hereof, $R_1$ is phenyl.

In one embodiment of the curable composition hereof, $R_2$ and $R_3$ are alkyl, and $R_4$ is hydrogen. In a further embodiment of the curable composition hereof, $R_2$ is ethyl, $R_3$ is methyl, and $R_4$ is hydrogen.

In one embodiment of the curable composition hereof, the imidazolium monocarboxylate salt is 2-ethyl-4-methyl imidazolium benzoate.

In one embodiment, the curable composition further comprises plasticizer, filler, carboxy terminated rubber, flame retardants, antioxidants, UV stabilizers, and other such additives that are known in the art to be added to epoxy compositions. In one embodiment, the curable composition further comprises a carboxy terminated rubber. In another embodiment, the curable composition further comprises a flame retardant.

While it is important to successful practice of the invention that the epoxy, curing agent, and imidazolium monocarboxylate be mutually soluble in a solvent such as MEK, it is not necessary that all the additives thereto, as recited supra, be dissolved. Instead they can be dispersed in the solution as particles.

In one embodiment, the imidazolium monocarboxylate salt is the benzoate salt of 2-ethyl-4-methyl imidazole.

In another aspect, the invention provides a method for curing an epoxy composition, the method comprising combining an epoxy, a phenolic curing agent, an imidazolium monocarboxylate salt, and a solvent to form a reaction mixture, and heating said reaction mixture to a temperature in the range of 120 to 200° C., and maintaining the temperature until the desired level of curing has taken place, wherein the imidazolium monocarboxylate salt is represented by Structure I.

Uncured epoxies suitable for use in the method for curing hereof include but are not limited to novolac phenol, cresol novolac, epoxies based on bisphenol A, epoxies based on biphenol, or epoxy adducts of carboxy terminated rubbers.

Solvents suitable for use in the method for curing hereof include but are not limited to benzene, methyl ethyl ketone (MEK), tetrahydrofuran (THF), dioxane, ethyl acetate. In one embodiment of the method for curing hereof, the solvent is MEK.

In one embodiment of the method for curing hereof, $R_1$ is phenyl, 4-methyl phenyl, 4-ethyl phenyl, naphthyl, or hexyl. In a further embodiment of the curable composition hereof, $R_1$ is phenyl.

In one embodiment of the method for curing hereof, $R_2$ and $R_3$ are alkyl, and $R_4$ is hydrogen. In a further embodiment of the method for curing hereof, $R_2$ is ethyl, $R_3$ is methyl, and $R_4$ is hydrogen.

In one embodiment of the method for curing hereof, the imidazolium monocarboxylate salt is 2-ethyl-4-methyl imidazolium benzoate.

In one embodiment, the method for curing hereof the reaction mixture further comprises plasticizer, filler, carboxy terminated rubber, flame retardants, antioxidants, UV stabilizers, and other such additives that are known in the art to be added to epoxy compositions. In one embodiment of the method for curing hereof, the reaction mixture further comprises a carboxy terminated rubber. In another embodiment of the method for curing hereof, the reaction mixture further comprises a flame retardant.

While it is important to successful practice of the invention that the epoxy, curing agent, and imidazolium monocarboxylate be mutually soluble in a solvent such as MEK, it is not necessary that all the additives thereto, as recited supra, be dissolved. Instead they can be dispersed in the reaction mixture as particles.

In one embodiment of the method of curing hereof, the imidazolium monocarboxylate salt is the benzoate salt of 2-ethyl-4-methyl imidazole.

In another aspect, the invention provides a method for preparing a coated substrate, the method comprising causing an uncured epoxy solution to be coated onto a substrate at a temperature below 100 C, wherein said uncured epoxy solution comprises a combination of an epoxy, a phenolic curing agent, an imidazolium monocarboxylate salt, dissolved in a solvent, wherein the imidazolium monocarboxylate salt is represented by Structure I.

Uncured epoxies suitable for use in the method for preparing a coated substrate hereof include but are not limited to novolac phenol, cresol novolac, epoxies based on bisphenol A, epoxies based on biphenol, or epoxy adducts of carboxy terminated rubbers.

While a solvent is not strictly required to effect the coating, it is found in the practice of the invention that inclusion of a solvent results in a solution having viscosity in a range that permits the preparation of coatings having a thickness in the range of 10 to 50 micrometers, preferably 20 to 30 micrometers.

Solvents suitable for use in the method for preparing a coated substrate hereof include but are not limited to acetone, MEK, toluene, dimethylformamide, dimethylacetamide, THF, propylene glycol methyl ether acetate, monopropylenglycolmonomethylether (Dowanol®PM, available from Dow Chemical Company). Water, alcohol, and ethers can also be used but epoxy adducts of rubbers will not dissolve. In one embodiment of the method for preparing a coated substrate hereof, the solvent is MEK.

Substrates suitable for use in the method for preparing a coated substrate hereof include but are not limited to films and sheets comprising poly(ethylene terephthalate), poly(ethylene naphthalate), polyethylene, polypropylene, and polyimide. It is highly preferred to pretreat the surface of the film or sheet to enhance adhesion. Treatment by corona discharge has been found to be effective.

Preferred substrates are polyimides. More preferred are fully aromatic polyimides. Most preferred are polyimide films made from the condensation product of aromatic dianhydrides and aromatic diamines available as Kapton® E polyimide film from the DuPont Company.

Coating can be effected by any convenient means known in the art. Good control of coating thickness at thicknesses in the range of 10 to 50 micrometers is obtained using die coating, doctor blade coating, or coating using Meyer rods. Coating can also be effected using spray, pads, hand rollers but those methods provide less effective control over the coating thickness and uniformity, and are therefore less preferred.

Coating technology is extremely well-known in the art. One reference book on the subject is *Organic Coatings Science & Technology*, Wicks et al, ed., John Wiley & Sons, 1999.

In one embodiment of the method for preparing a coated substrate hereof, $R_1$ is phenyl, 4-methyl phenyl, 4-ethyl phenyl, naphthyl, or hexyl. In a further embodiment of the curable composition hereof, $R_1$ is phenyl.

In one embodiment of the method for preparing a coated substrate hereof, $R_2$ and $R_3$ are alkyl, and $R_4$ is hydrogen. In a further embodiment of the method for preparing a coated substrate hereof, $R_2$ is ethyl, $R_3$ is methyl, and $R_4$ is hydrogen.

In one embodiment of the method for preparing a coated substrate hereof, the imidazolium monocarboxylate salt is 2-ethyl-4-methyl imidazolium benzoate.

In one embodiment, the method for preparing a coated substrate hereof the uncured coating further comprises plasticizer, filler, carboxy terminated rubber, flame retardants, antioxidants, UV stabilizers, and other such additives that are known in the art to be added to epoxy compositions. In one embodiment of the method for preparing a coated substrate hereof, the uncured coating further comprises a carboxy terminated rubber. In another embodiment of the method for preparing a coated substrate hereof, the uncured coating further comprises a flame retardant.

While it is important to successful practice of the invention that the epoxy, curing agent, and imidazolium monocarboxylate be mutually soluble in a solvent such as MEK, it is not necessary that all the additives thereto, as recited supra, be dissolved. Instead they can be dispersed in the uncured coating as particles.

In one embodiment of the method for preparing a coated substrate hereof, the imidazolium monocarboxylate salt is the benzoate salt of 2-ethyl-4-methyl imidazole.

In another embodiment, the method of preparing a coated substrate hereof further comprises applying the coating at room temperature.

In another embodiment, the method of preparing a coated substrate hereof further comprises extraction of the solvent by heating at a temperature above room temperature to about 120° C., and in any event, below the curing temperature of the uncured coating.

In another aspect, the invention provides a coated substrate comprising a substrate having disposed thereupon a coating where said coating comprises an uncured epoxy composition comprising a combination of an uncured epoxy, a phenolic curing agent, and an imidazolium monocarboxylate salt, wherein the imidazolium monocarboxylate salt is represented by Structure I.

Uncured epoxies suitable for use in the coated substrate hereof include but are not limited to novolac phenol, cresol novolac, epoxies based on bisphenol A, epoxies based on biphenol, or epoxy adducts of carboxy terminated rubbers.

Substrates suitable for use in the coated substrate hereof include but are not limited to films and sheets comprising poly(ethylene terephthalate), poly(ethylene naphthalate), polyethylene, polypropylene, and polyimide.

Preferred substrates are polyimides. More preferred are fully aromatic polyimides. Most preferred are polyimide films made from the condensation product of aromatic dianhydrides and aromatic diamines available as Kapton® E polyimide film from the DuPont Company.

Suitable substrate films or sheets can contain additives such as flame retardant and others that are typically included films or sheets, so long as the additive does not degrade the usefulness of the invention in the intended application. For example, some additives could degrade the flow of the uncured coating into the interstices of a printed wiring board that it is intended to conformally seal.

In one embodiment of the coated substrate hereof, $R_1$ is phenyl, 4-methyl phenyl, 4-ethyl phenyl, naphthyl, or hexyl. In a further embodiment of the curable composition hereof, $R_1$ is phenyl.

In one embodiment of the coated substrate hereof, $R_2$ and $R_3$ are alkyl, and $R_4$ is hydrogen. In a further embodiment of the coated substrate hereof, $R_2$ is ethyl, $R_3$ is methyl, and $R_4$ is hydrogen.

In one embodiment of the coated substrate hereof, the imidazolium monocarboxylate salt is 2-ethyl-4-methyl imidazolium benzoate.

In one embodiment, the coated substrate hereof the uncured coating further comprises plasticizer, filler, carboxy terminated rubber, flame retardants, antioxidants, UV stabilizers, and other such additives that are known in the art to be added to epoxy compositions. In one embodiment of the coated substrate hereof, the uncured coating further comprises a carboxy terminated rubber. In another embodiment of the coated substrate hereof, the uncured coating further comprises a flame retardant.

In one embodiment of the coated substrate hereof, the imidazolium monocarboxylate salt is the benzoate salt of 2-ethyl-4-methyl imidazole.

Viscosity control of the coating is important for obtaining the desired results, especially in electronics applications such as flexible circuit encapsulation where uniformity of dielectric constant is extremely important. Viscosity is adjusted by the choice and concentration of the ingredients of the uncured epoxy composition. For example the concentration and type of rubber. Flame retardants alter viscosity, sometimes in the wrong direction and compensation needs to be made for that effect. It is found in the practice of the invention that the addition of silica favorably increases the viscosity of the coating. It is also found that some thermal aging in the range of 50 to 120° C. favorably increases the viscosity of the uncured coating prior to subsequent lamination and curing, as described infra.

In another aspect, the invention provides a method for preparing a multilayer article comprising contacting a first substrate having a coating to a second substrate such that said coating is disposed between said first and second substrate, forming an uncured multilayer article, applying heat and pressure to said multilayer article thereby forming a cured multilayer article, said coating comprising an uncured epoxy composition comprising a combination of an epoxy, a phenolic curing agent, and an imidazolium monocarboxylate salt represented by Structure I.

In one embodiment the applied pressure is in the range of 0.7 to 14 MPa. Lamination can be effected using a vacuum press or a quick press, both well-known in the art. Lamination and cure temperature is in the range of 100 to 250° C., preferably 100 to 180° C. In practice of the invention it is found that in vacuum presses a lamination time of 60-120 minutes is required to obtain suitable flow and curing. In a quick press, lamination is effected in 1-2 minutes, and curing is effected in a post-cure step in an oven.

Uncured epoxies suitable for use in the coated first substrate hereof include but are not limited to novolac phenol, cresol novolac, epoxies based on bisphenol A, epoxies based on biphenol, or epoxy adducts of carboxy terminated rubbers.

Substrates suitable for use in the coated first substrate hereof include but are not limited to films and sheets comprising poly(ethylene terephthalate), poly(ethylene naphthalate), polyethylene, polypropylene, and polyimide.

Preferred for the first substrate hereof are polyimides. More preferred are fully aromatic polyimides. Most preferred are polyimide films made from the condensation product of aromatic dianhydrides and aromatic diamines available as Kapton® E polyimide film from the DuPont Company.

In one embodiment of the coated first substrate hereof, in the imidazolium monocarboxylate, $R_1$ is phenyl, 4-methyl phenyl, 4-ethyl phenyl, naphthyl, or hexyl. In a further embodiment of the curable composition hereof, $R_1$ is phenyl.

In one embodiment of the coated first substrate hereof, in the imidazolium monocarboxylate, $R_2$ and $R_3$ are alkyl, and $R_4$ is hydrogen. In a further embodiment of the coated first substrate hereof, in the imidazolium monocarboxylate $R_2$ is ethyl, $R_3$ is methyl, and $R_4$ is hydrogen.

In one embodiment of the coated first substrate hereof, the imidazolium monocarboxylate salt is 2-ethyl-4-methyl imidazolium benzoate.

In one embodiment, the coated first substrate hereof the uncured coating further comprises plasticizer, filler, carboxy terminated rubber, flame retardants, antioxidants, UV stabilizers, and other such additives that are known in the art to be added to epoxy compositions. In one embodiment of the coated first substrate hereof, the uncured coating further comprises a carboxy terminated rubber. In another embodiment of the coated first substrate hereof, the uncured coating further comprises a flame retardant.

In one embodiment of the coated first substrate hereof, the imidazolium monocarboxylate salt is the benzoate salt of 2-ethyl-4-methyl imidazole.

Suitable for use as the second substrate in the method for preparing a multilayer article hereof is any low-dielectric material, polymeric or ceramic, glass reinforced or not. Preferred is a polyimide. More preferred is a fully aromatic polyimide. Most preferred are polyimide films made from the condensation product of aromatic dianhydrides and aromatic diamines available as Kapton® E polyimide film from the DuPont Company.

In a preferred embodiment, the second substrate further comprises a metallic coating disposed between the low dielectric constant second substrate and the epoxy layer. In a further embodiment, the metallic coating describes discrete conductive pathways disposed upon said low dielectric constant second substrate. In a further embodiment, the metallic coating is copper.

In a preferred embodiment, the first substrate comprising the uncured epoxy composition hereof is employed in the method hereof to provide a conformal coating to the second substrate comprising metallic conductive pathways.

Particularly suitable for use in the method for preparing a multilayer article hereof is a so-called printed wiring board (PWB) comprising a fully aromatic polyimide substrate having discrete copper pathways disposed thereon. PWBs can be prepared by a process comprising laminating a copper foil to a dielectric film or sheet using a combination of an adhesive layer, often an epoxy, and the application of heat and pressure. To obtain high resolution circuit lines ($\leq 125$ micrometers in width) photoresists are applied to the copper surface. A photoresist is a light-sensitive organic material that when subject to imagewise exposure the photoresist surface is exposed to light which forms an image on the photoresist so that when the photoresist is developed and the surface etched, the image will appear in the form of a plurality of discreet conductive pathways upon the surface of the film or sheet suitable for the practice of the invention.

A photoresist can either be applied as a liquid and dried, or laminated in the form, for example, of polymeric film deposited on a polyester release film. When liquid coating is employed, care must be employed to ensure a uniform thickness. When exposed to light, typically ultraviolet radiation, a photoresist undergoes photopolymerization, thereby altering their solubility in a "developer" chemical. Negative photoresists typically consist of a mixture of acrylate monomers, a polymeric binder, and a photoinitiator. Upon imagewise UV exposure through a patterning photomask, the resist polymerizes and becomes insoluble to the developer. Unexposed areas remain soluble and are washed away, leaving the areas of copper representing the conductive pathways protected by the polymerized photoresist from a subsequent etching step. Positive resists function in the opposite way with exposed areas becoming soluble in the developing solvent. Both positive and negative photoresists are in widespread commercial use. One well-known positive photoresist is the so-called DNQ/Novolac photoresist composition.

Any printed wiring board prepared according to the methods of the art is suitable for use in the present invention.

EXAMPLES

Example 1

2.203 g of 2-ethyl-4-methyl imidazole (EMI) and 2.441 g of benzoic acid was dissolved in 25 g of methyl ethyl ketone (MEK) in a 100 ml round bottom flask and refluxed this solution for two hours using a water condenser and cooled to temperature.

The salt formation was confirmed by NMR analysis (Varian (nova Spectrometer, 500 MHz). The hydrogen substituent in the C5 atom of the ring appears as a doublet at δ (ppm) 6.38 and 6.6 in the 2-ethyl-4-methyl imidazole and as a singlet at δ 6.57 in the imidazolium benzoate salt. The protons attached to the nitrogen atom in the ring appear above 10 ppm

Example 2

Various imidazole-monocarboxylic acid salts were prepared by dissolving in 25 g of methyl ethyl ketone 2.203 g of 2-ethyl-4-methyl imidazole and other monocarboxylic acids in the amounts shown in Table 1. In each case, the solution was refluxed for two hours and then cooled to room temperature.

TABLE 1

| Example | Monocarboxylic acid | Amount (g) | Product |
| --- | --- | --- | --- |
| 2a | Naphthoic acid | 3.444 | 2-ethyl-4-methyl imidazolium naphthylate |
| 2b | p-tolueic acid | 2.723 | 2-ethyl-4-methyl imidazolium p-toluate |
| 2c | 4-ethyl benzoic acid | 3.003 | 2-ethyl-4-methyl-imidazolium 4-ethyl benzoate |
| 2d | Hexanoic acid | 2.323 | 2-ethyl-4-methyl-imidazolium hexanoate |

Example 3 and Comparative Example A

The catalytic efficiency of the imidazole acid catalysts was determined by measuring the heat evolved during curing of a curable composition comprising an epoxy resin. The greater the heat evolved, the more complete the curing reaction. The composition consisted of 2.25 g of Araldite ECN 1278 (Huntsman Chemicals, USA), 13.8 g of elastomer modified solid bisphenol A epoxy resin Hypox RK84L (CVC Specialty Chemicals Inc, Moorestown, USA), 6.0 g of carboxy-terminated acrylonitrile-butadiene rubber Hypro CTBN X13 (CVC Specialty Chemicals Inc) and 1.3936 g of phenolic novolac resin GP-5833 (Georgia Pacific, Atlanta, Ga.). These ingredients were dissolved in MEK at 30% by weight solids content. 0.045 g of EMI or the molar equivalent amount of the corresponding salt, shown in Table 2 were added to the solutions so formed.

The solutions so formed were stirred at room temperature for 30 minutes. After the 30 minute stirring period, 2 ml of the each solution was transferred to a Corning glass petri dish and evaporated in an air circulating oven at 50° C. for 10 minutes. The viscous mass that resulted therefrom was sealed in a specimen pan and analyzed by Differential Scanning calorimetry (DSC) analysis according to ASTM D3418-08 (TA Instruments). The specimen was heated at a rate of 10° C./min from 25° C. to 280° C. in a nitrogen atmosphere. The results were analyzed using the TA Universal Analysis program.

Table 2 shows the peak curing temperature and the heat of curing determined for each specimen. Comparative Example A (CE-A) is for 2-ethyl-4-methyl imidazole unreacted with a monocarboxylic acid.

TABLE 2

| Specimen | Amount of specimen in curable composition (g) | Peak cure temperature (° C.) | Heat of curing (J/g) |
| --- | --- | --- | --- |
| CE-A | 0.0450 | 177.7 | 40.96 |
| Example 1 | 0.0949 | 178.4 | 60.49 |
| Example 2a | 0.1153 | 178.5 | 55.88 |
| Example 2b | 0.1006 | 178.9 | 48.35 |
| Example 2c | 0.1063 | 179.0 | 50.97 |
| Example 2d | 0.0925 | 179.5 | 55.89 |

Example 4 and Comparative Example B

Gel-time of uncured compositions was determined according to IPC-TM-650, number 2.3.18. The epoxy composition consisted of 2.25 g of Araldite ECN 1273, 13.8 g of Hypox RK84L. 1.54 g of Hypro CTBN X13 and 2.27 g of Durite D_SD-1819 (phenol-dicyclopentadiene adduct from Borden Chemical Inc., Louisville, Ky.). 0.045 g of EMI (CE-B) and 0.0949 g of salt of Example 1 were incorporated in respective compositions.

The time to gelation of each composition was measured after the indicated number of days in storage at the indicated temperatures. Results are shown in Table 3. As a rule of thumb, a decrease in gel time of 30 seconds or greater is generally considered unacceptable for commercial purposes.

TABLE 3

| Storage (days) | Gel time (seconds) | | | |
| --- | --- | --- | --- | --- |
| | CE-B | | Example 1 | |
| | 23° C. | 3° C. | 23° C. | 3° C. |
| 0 | 150 | — | 150 | — |
| 1 | 142 | 152 | 150 | — |
| 7 | 141 | 149 | 151 | — |
| 11 | 139 | 150 | 153 | 156 |
| 14 | 139 | 145 | 145 | 154 |
| 18 | 140 | 145 | 145 | 155 |

TABLE 3-continued

| Storage | Gel time (seconds) | | | |
|---|---|---|---|---|
| | CE-B | | Example 1 | |
| (days) | 23° C. | 3° C. | 23° C. | 3° C. |
| 23 | 126 | 140 | 150 | 150 |
| 30 | 122 | 135 | 143 | 145 |
| 37 | 118 | 130 | 135 | 140 |
| 51 | 115 | 128 | 128 | 140 |
| 65 | 115 | 128 | 130 | 140 |

Examples 5-8

Cured epoxy compositions were evaluated for the adhesive strength of the bond it formed between polyimide and copper. The compositions employed are shown in Table 4. In addition to the ingredients described supra, the following additional ingredients were used: Nipol 1072J rubber (Zeon Corporation, Japan) Phenolite LA7052 curing agent (Dainipoon Ink & Chemicals<Japan). Flame retardants Melamine polyphosphate (Phosmel-200, Nissan Chemical Industries, Ltd. Tokyo, Japan) and magnesium hydroxide (Vertex 90SP, Huber Engineered Material, Atlanta, Ga.) were also incorporated in the amounts shown. The phosmel was used as received condition. The magnesium hydroxide was media milled with 5% epoxy silane for one hour to reduce the particle size (d10=0.081 µm, d50=0.337 µm, d90=1.448 µm, as determined by light scattering). The 2-ethyl-4-methyl-imidazolium benzoate of Example 1 was employed in the compositions in the amounts shown.

TABLE 4

| Ingredients | Example 5 (wt. %) | Example 6 (wt. %) | Example 7 (wt. %) | Example 8 (wt. %) |
|---|---|---|---|---|
| Araldite ECN 1273 | 5.0 | 5.0 | 4.8 | 5.8 |
| Hypox RK 84L | 30.8 | 30.6 | 29.2 | 35.1 |
| Hypro CTBN X13 | — | 13.3 | 6.4 | 7.6 |
| Nipol 1072J | 13.4 | — | 6.4 | 7.6 |
| D_SD-1819 | 5.6 | 5.9 | — | — |
| GP 5833 | — | — | 1.5 | 1.8 |
| Phenolite LA 7052 | — | — | 1.5 | 1.9 |
| Example 1 | 0.4 | 0.4 | 0.2 | 0.2 |
| Vertex 90SP | 44.8 | 44.8 | 50.0 | — |
| Phosmel | | | | 40.0 |

Examples 9, 10 11, 12

Each composition shown in Table 4 was respectively dispersed in MEK at 32 to 38 wt. % solid contents. The dispersions so formed were coated on a 12.5 µm polyimide film (50FPC Kapton, Dupont, Circleville, USA) using a 7.0 mil coating knife for about 25 micrometer thickness. The coating was dried at 80° C. for ten minutes.

The thus coated polyimide films were laminated to and simultaneously cured with a copper clad Pyralux® AC182000R with the curable epoxy composition of Table 4 contacting the copper side, thereby forming a multilayer article. Curing was effected in a vacuum press at 177° C. for 105 minutes under 2.2 MPa pressure.

The thus prepared cured multilayer article was evaluated as follows:
Peel strength was determined according to IPC-TM-650 Number 2.4.9. The Pyralux® AC182000R layer was peeled away from the polyimide layer at a 90° angle.
Solder resistance was determined for a 10 second exposure to a 288° C. solder bath, according to IPC-TM-650 Number 2.4.13. Pass and fail criteria were as described in the method.
Resin flow was determined using 0.6 and 0.8 mm holes, at four measurements per hole, according to IPC-TM-650 Number 2.3.17.1 The values reported are the average values.
Flammability was evaluated against the VTM-0 standard as determined according to ASTM D4804-03.

TABLE 5

| Properties | Example 9 | Example 10 | Example 11 | Example 12 |
|---|---|---|---|---|
| Epoxy Composition | Example 5 | Example 6 | Example 7 | Example 8 |
| Peel strength[a] (N/mm) | | | | |
| as made | 0.82 | 0.66 | 0.63 | 0.77 |
| after solder float | 0.80 | 0.77 | 0.71 | 0.65 |
| after humidity conditioning | 0.63 | — | 0.51 | 0.79 |
| Solder resistance[b] | pass | pass | Pass | pass |
| Resin flow[c] (mm) | <0.1 | >0.15 | 0.05 | 0.3 |
| VTM-0[d] | fail | fail | Fail | pass |

Examples 13, 14, 15, 16

The coated polyimide films prepared in Examples 9-12 were laminated and cured with Pyralux® AC182000R, with the epoxy coating facing the copper side, in a quick press at 185° C. under 100 kgf/cm2 pressure for 120 seconds. The thus prepared multilayer laminates were removed and post cured in a convection oven at 160° C. for 60 minutes. The methods of evaluation were the same as described for Examples 9-12. Results are shown in Table 6.

TABLE 6

| Properties | Example 13 | Example 14 | Example 15 | Example 16 |
|---|---|---|---|---|
| Epoxy Composition | Example 5 | Example 6 | Example 7 | Example 8 |
| Peel strength (N/mm) | | | | |
| as made | 0.75 | 0.34 | 0.67 | 0.48 |
| after solder | 0.83 | 0.66 | 0.65 | 0.47 |
| after humidity conditioning | 0.72 | — | 0.54 | 0.30 |
| Solder resistance | pass | — | pass | pass |
| Resin flow (mm | <0.1 | >0.15 | 0.06 | 0.3 |
| VTM-0 | fail | fail | fail | pass |

Examples 17, 18, 19, 20

The adhesive coated polyimide films were laminated to copper circuits to evaluate the following properties listed in tables 7 & 8. The copper circuits were made by laminating photoresist Dupont Riston® TM213i in a hot roll laminator (Dupont Riston® Laminator) with single side resin clad; Pyralux® AC352500R for 35 µm thick copper lines or Pyralux® 182000R for 18 micrometer thick copper lines. The circuit was patterned by exposing the resist containing Pyralux® in a Dupont Riston® PC130, subsequently etched with standard acid etcher (hydrogen peroxide & cupric chloride) and striped with Ostech® OS987 resist stripper.

The thus developed circuit pattern was laminated and cured with the coated polyimide films prepared in Examples 5-8, with the epoxy coating facing the circuit, in a convention press at 177° C. for 105 minutes under 2.2 MPa pressure to produce a conformally sealed printed wiring board.

Conformation, curl, and moisture and insulation resistance were determined for each thus prepared multilayer laminate. The conformation test was done with a printed circuit containing 100 micrometer lines and spaces (L/S) and 35.0 micrometer copper thickness. A rating of "pass" indicates complete filling of the spaces & lines with no air bubbles; a rating of "fail" indicates incomplete filling of the lines and spaces. Conformation was determined by visual evaluation using an optical microscope.

The curl test was done with a circuit pattern containing 100 micrometer lines and spaces, in a laminate that measured 13 cm×6.2 cm. Height was measured at each corner and the average value for five specimens is reported. in Table 7.

Moisture and insulation resistance was determined according to IPC-TM-650 Number 2.6.3.2 using a circuit containing 100 micrometer lines and spaces with a comb pattern of copper having a thickness of 18 micrometers. The test condition was 100V DC, 85° C./85% RH. The time required for circuit resistance to fall below $10^6$ ohms is reported.

TABLE 7

| Properties | Example 17 | Example 18 | Example 19 | Example 20 |
|---|---|---|---|---|
| Epoxy Composition | Example 5 | Example 6 | Example 7 | Example 8 |
| Conformation | Fail | Pass | Pass | pass |
| Curl (mm) | >1 | — | <1 | <1 |
| Moisture & insulation Resistance (hours) | >600 | — | — | — |

Examples 21, 22, 23, 24

The printed circuit prepared supra was laminated and cured with the coated polyimide films of Examples 5-8, with the coating facing the circuit, in a quick press at 185° C. under 100 kgf/cm2 pressure for 120 seconds. The laminates were removed and post cured in a convection oven at 160° C. for 60 minutes to produce a conformally sealed printed wiring board.

Conformation and curl were determined as in Examples 17-20.

TABLE 8

| Properties | Example 21 | Example 22 | Example 23 | Example 24 |
|---|---|---|---|---|
| Epoxy composition | Example 5 | Example 6 | Example 7 | Example 8 |
| Conformation | fail | Pass | pass | pass |
| Curl (mm) | >1 | — | <1 | <1 |

What is claimed is:

1. A curable composition comprising a solution comprising an epoxy, a phenolic curing agent, and an imidazolium monocarboxylate salt, dissolved in a solvent, wherein the imidazolium monocarboxylate salt is represented by Structure I

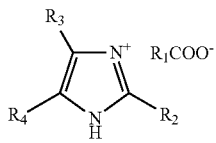

wherein $R_1$ is phenyl, naphthyl, 4-ethyl phenyl, or pentyl; and, $R_2$ is methyl or ethyl, $R_3$ is hydrogen or methyl, and $R_4$ is hydrogen or methyl.

2. The curable composition of claim 1 wherein $R_4$ is H.

3. The curable composition of claim 1 wherein $R_2$ is ethyl and $R_3$ is methyl.

4. The curable composition of claim 1 wherein the imidazolium monocarboxylate salt is 2-ethyl-4-methyl imidazolium benzoate.

5. The curable composition of claim 1 further comprising a flame retardant.

6. The curable composition of claim 1 further comprising a carboxy-terminated rubber.

7. A method for curing an epoxy composition, the method comprising combining an epoxy, a phenolic curing agent, an imidazolium monocarboxylate salt, and a solvent to form a reaction mixture, and heating said reaction mixture to a temperature in the range of 120 to 200° C., and maintaining the temperature until the desired level of curing has taken place, wherein the imidazolium monocarboxylate salt is represented by Structure I

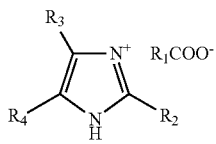

wherein $R_1$ is phenyl, naphthyl, 4-ethyl phenyl, or pentyl; and, $R_2$ is methyl or ethyl, $R_3$ is hydrogen or methyl, and $R_4$ is hydrogen or methyl.

8. The method of claim 7 wherein $R_4$ is H.

9. The method of claim 7 wherein $R_2$ is ethyl and $R_3$ is methyl.

10. The method of claim 7 wherein the imidazolium monocarboxylate salt is 2-ethyl-4-methyl imidazolium benzoate.

11. The method of claim 7 wherein said reaction mixture further comprises a flame retardant.

12. The method of claim 7 wherein said reaction mixture further comprises a carboxy-terminated rubber.

* * * * *